(12) United States Patent
Smith et al.

(10) Patent No.: US 7,886,621 B2
(45) Date of Patent: Feb. 15, 2011

(54) DIGITAL FOAM

(75) Inventors: Ross Travers Smith, Ingle Farm (AU);
Bruce Hunter Thomas, Wayville (AU);
Wayne Piekarski, Santa Barbara, CA (US)

(73) Assignee: University of South Australia, Adelaide, South Australia ( * ) Notice: Subject to any disclaimer, the term of this patent is extended or adjusted under 35 U.S.C. 154(b) by 209 days.

(21) Appl. No.: 12/381,147

(22) Filed: Mar. 6, 2009

(65) Prior Publication Data

US 2010/0225340 A1    Sep. 9, 2010

(51) Int. Cl.
*G01L 1/00* (2006.01)
(52) U.S. Cl. ..................... 73/862.381; 73/777
(58) Field of Classification Search ............ 73/777, 73/862.381–862.391
See application file for complete search history.

(56) References Cited

U.S. PATENT DOCUMENTS

| | | | | |
|---|---|---|---|---|
| 4,481,815 | A * | 11/1984 | Overton | 73/865.7 |
| 4,839,512 | A * | 6/1989 | Speck | 250/231.1 |
| 5,060,527 | A | 10/1991 | Burgess | |
| 5,666,473 | A | 9/1997 | Wallace | |
| 6,239,785 | B1 | 5/2001 | Wallace et al. | |
| 6,769,313 | B2 * | 8/2004 | Weiss | 73/862.046 |
| 6,871,395 | B2 * | 3/2005 | Scher et al. | 29/840 |
| 7,066,376 | B2 * | 6/2006 | Scher et al. | 228/175 |
| 7,132,642 | B2 * | 11/2006 | Shank et al. | 250/221 |
| 7,373,843 | B2 | 5/2008 | Ganapathi et al. | |
| 7,467,558 | B2 * | 12/2008 | Fukuda et al. | 73/862.68 |

OTHER PUBLICATIONS

Brady et al., "Inherently conducting polymer modified polyurethane smart foam for pressure sensing", Apr. 13, 2005, Sensors and Actuators A: Physical, pp. 398-404, v119n2.
Smith et al., "Digital foam interaction techniques for 3-D modeling", Oct. 27-29, 2008, Virtual Reality Software Technology, pp. 61-68.
Smith et al., "Digital foam", Mar. 8, 2008.
Brady et al. Inherently conducting polymer modified polyurethane smart foam for pressure sensing, Sensors and Actuators A 119 (2005) 398-404.

* cited by examiner

*Primary Examiner*—Max Noori
(74) *Attorney, Agent, or Firm*—Lumen Patent Firm

(57) ABSTRACT

A displacement sensor element and a haptic sensor arrangement using two or more displacement sensor elements are provided. The arrangements can be used for real-time capture of the shape of haptic deformation of the sensor arrangement. Although examples described in detail herein are primarily directed to tactile applications, the sensor can be used in the machine, robotic and medical fields where a sensor of this type can usefully be applied where only machine or computer controlled robotic elements are interacting, particularly if the machines or robotic elements are being used in human like applications but other force measurement applications are possible.

15 Claims, 13 Drawing Sheets

DIGITAL FOAM

FIELD OF THE INVENTION

This invention is in the field of haptic sensors and the computer related and assisted functionality which becomes possible with the output from such sensors.

BACKGROUND OF THE INVENTION

Surface modeling and geometry capture are used in a range of computer assisted fields including Augmented Reality (AR), Virtual Reality (VR), computer graphics, medical imaging, visualization systems, and artistic fields. To support these systems, a variety of human controllable input devices and techniques have been developed to assist the modeling process. Clay and similar materials have been used for sculpting real models for many years.

One technique used to capture physical geometries is to measure the physical object and manually enter each dimension. Commercially available laser scanners allow the capture of complex geometries and generate digital presentations having a high polygon count. Such scanners are not designed for real-time manipulation tasks and deformations and corrections are usually needed to correct the captured model. Some systems use a number of photographs taken from different angles; which are processed manually to create a representation of the geometry of the photographed article. The Tinmith system uses pinch gloves and fiducial markers to track a user's thumbs allowing a range of computer aided design (CAD) like interaction techniques including construction at a distance, AR working planes, infinite carving planes, orthogonal laser carving, and creating a surface of revolution using AR. VR systems such as Virtual Clay provide an interactive freeform modeling environment. There also exists an interactive sculpting framework that encompasses modeling techniques based on the subdivision of solid geometries. It supports clay like manipulations, and more, allowing intuitive sculpting to be performed with physics based responses and haptic feedback using a phantom device.

Other input devices allow the creation, manipulation, and navigation of 3D geometries. The "two-4-six" input device is designed to support 3D manipulations with six degrees of freedom. It was designed for interactive presentations of virtual objects using multiple sensors as inputs. Orientation is tracked using gyroscopes and a rocker leaver, and an elastic touchpad is used to control rotation, translation, and manipulation operations. The Cubic Mouse is a cube-shaped input device with three rods that protrude through the faces of a cube. By pulling and pushing on the rods, motion is specified on the corresponding X, Y and Z axis. This input device also has 6 degrees of freedom (DOF) tracking to allow registration with a virtual environment.

Malleable surfaces are tracked using a camera mounted underneath a silicon membrane. The silicone membrane has colored dots printed on its surface that are observed by the camera. Deformations can then be calculated in software allowing a reconstruction of the silicon's surface shape. A limitation of this form of malleable surface is that to construct a malleable spherical prop where all surfaces can be squashed is not simple since a support structure is required to hold the stretched silicon in place preventing depression in some locations.

SUMMARY OF THE INVENTION

In an aspect of the invention a displacement sensor element includes an electrically conductive elastomeric member which is elastomeric along at least one axis and having at least one electrical characteristic that changes when the elastomeric member is compressed along the least one axis by a tactile force, and two conductive terminals located and in conductive contact with respective opposite sides of the elastomeric member in-line with the same at least one axis, such that between the two conductive terminals at least one electrical characteristic of the conductive elastomeric member is representative of the distance between the terminals.

In an embodiment of the invention the conductive elastomeric member is a foam material having gaseous voids.

In an embodiment of the invention at least one of the two conductive terminals is conductive fabric.

In accordance with the previous aspect of the electrical characteristic of the elastomeric member is one or more of the group consisting of voltage, current, resistance, dielectric constant, and capacitance.

In a further aspect of the invention a haptic sensor arrangement located on a supporting substrate for tactile actuation includes, at least two spaced electrically conductive elastomeric members, wherein each member is elastomeric along at least one axis and having at least one electrical characteristic that changes when the elastomeric member is compressed along at least one axis by a tactile force, each sensor located at a known position with respect to the supporting substrate; a tactile force transference member located over and between each sensor such that the tactile force transference member is arranged to change an electrical characteristic of at least one sensor in response to a tactile actuation; and a processor for measuring a said electrical characteristic of each sensor to determine a distance between the tactile force transference member and the supporting surface, and using the spacing between actuated spaced conductive elastomeric members to determine the position and displacement of the actuation with respect to the supporting substrate.

In an embodiment of the invention of a haptic sensor arrangement there is further non-conductive elastomeric material which has substantially the same elastomeric response characteristics as the conductive elastomeric member arranged to substantially fill the volume between spaced the conductive elastomeric members and electrically isolate the conductive elastomeric members from each other.

In accordance with the previous aspect of the invention the electrical characteristic of the elastomeric member is one or more of the group consisting of voltage, current, resistance, dielectric constant, and capacitance.

In an embodiment of the invention the electrical characteristic of the single axis displacement sensor is resistance.

An embodiment of the invention in accord with an embodiment of the haptic sensor arrangement, further includes an electrical terminal arranged to be in conductive contact with the tactile force transference member and the conductive elastomeric member, and an electrical terminal arranged to be in conductive contact with the conductive elastomeric member and abutment with the supporting substrate, both being terminals between which resistance is measured.

In an embodiment of the invention one or more characteristics of the haptic sensor arrangement are processed by the processor so as to substantially map a surface topology of the haptic force transference member with respect to the supporting substrate.

In an embodiment of the invention the haptic force transference member is electrically conductive fabric.

In yet a further aspect of the invention is a method of manipulating a computer menu used to operate and interact with a haptic input device to the computer, the steps of the method including, applying a tactile force to one or more locations on the haptic input device to select a menu input mode in the associated computer; orientating the haptic input device to change the menu selection; and applying a further tactile force or removing a previous tactile force to make the menu selection.

Specific embodiments of the invention will now be described in some further detail with reference to and as illustrated in the accompanying figures. These embodiments are illustrative, and not meant to be restrictive of the scope of the invention. Suggestions and descriptions of other embodiments may be included within the scope of the invention but they may not be illustrated in the accompanying figures or alternatively features of the invention may be shown in the figures but not described in the specification.

BRIEF DESCRIPTION OF THE FIGURES

FIG. 22b depicts an illustration of the camera location transition instigated by the user control illustrated in FIG. 22a;

DETAILED DESCRIPTION

Figure 1:
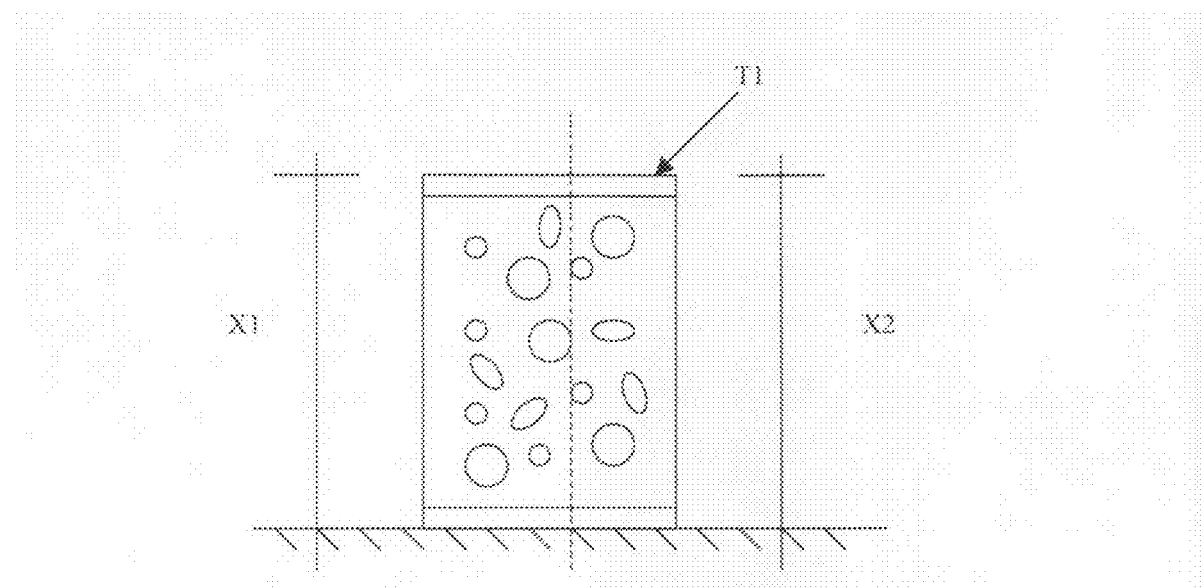
FIG. 1 depicts a pictorial representation of an embodiment of a displacement sensor.
Figure 2:
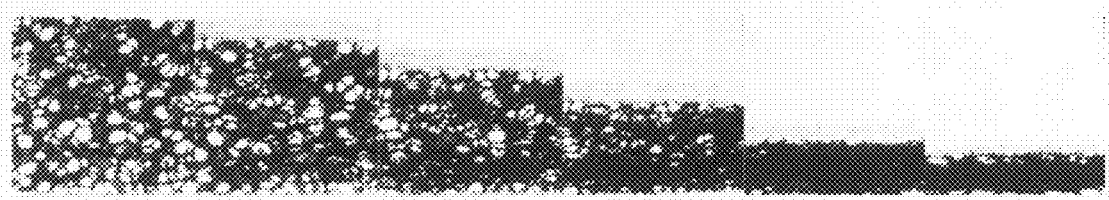
FIG. 2 depicts a pictorial representation of an embodiment of an electrically conductive elastomeric member.

Both a displacement sensor element and a haptic sensor arrangement using two or more displacement sensor elements are described herein. The arrangements can be used for real-time capture of the shape of haptic deformation of the sensor arrangement. Although the embodiments described in detail herein are primarily directed to tactile applications the sensor can be used in the machine, robotic and medical fields where a sensor of this type can usefully be applied where only machine or computer controlled robotic elements are interacting, particularly if the machines or robotic elements are being used in human like applications but other force measurement applications are possible.

In an embodiment the sensor element and an array of such sensor arrangements, use the variable resistive properties of conductive foam an example of which is obtainable from RS Components Pty Ltd of 25 Pavesi Street, Smithfield, NSW, Australia having catalogue number 550-066 and in the same embodiment covered by a conductive fabric, an example of which is obtainable from Less EMF of 809 Madison Avenue, Albany, N.Y., USA having catalogue number A251.

By measuring the voltage difference across the conductive foam when it is compressed, a repeatable and accurate measurement of the distance between the surface of the sensor and the supporting substrate is obtained. The substrate can be of a variety of shapes and in one embodiment disclosed the form is of a plane and in another embodiment in the form of a spheroid, over which the sensor arrangement is constructed so that the tactile force responsive surface provided by the haptic sensor arrangement can be mapped directly to the supporting substrate of the embodiment. From those measurements the physical topology of the embodiment is used to create a matching geometry in the form of a digital representation, which in turn can be displayed in real-time or stored for later use.

In one example of the use of the embodiments, as the user of the embodiment applies tactile force to the surface of the haptic sensor arrangement the elastomeric property of the arrangement provides a tactile response which is useful in providing a realism to the interaction of the user with the arrangement. Since the sensor arrangement eventually returns to an unbiased elastomeric state thus restoring the surface to a known state, the user can re-use the same or a varying tactile force to further adjust the shape of the digital representation provided in real-time. Different foam materials exhibit different restoration characteristics and in one example, the foam returns to 90% of its original size "almost immediately" and the remaining 10% will take a maximum of 24 hours to return. Another way in which the sensor can be used is to allow for a successive application of tactile force to be cumulative to a prior application of tactile force so that the user sees a cumulative effect on the digital representation, which would be much like a real tactile interaction with a malleable object.

The digital representation can also be used for creating other digital mappings and representations usable in a variety of ways, some examples of which include, VR, AR and 3D and 2D modeling, computer graphics, medical imaging, visualization aids and the arts.

Two embodiments of haptic sensor arrangements are disclosed and shown in use as input devices that allow real-time capture of their physical manipulation using tactile forces.

FIG. 1 depicts the operation of a single foam sensor. As the foam is depressed, the resistance of the foam reduces, which is but one of the many electrical characteristics of the foam which can be measured. Indeed, the use of foam is but an example of an electrically conductive elastomeric member and the measurement of resistance is but one of the many electrical characteristics the member has, which can include voltage, current, dielectric constant and capacitance. These characteristics can be measured across the member with and sometimes without the use of electrical terminals located on opposite sides of the member.

The electrically conductive elastomeric member has at least one axis (shown by the vertical dotted line) along which the member can be compressed/deformed and the arrangement of electrical terminals in electrically conductive contact with the member on opposite sides but located in-line with at least one of those axes allows for measurement to be performed between those terminals.

In this embodiment the initial resistance of a 24 mm thick piece of foam is 20 k Ohms and when depressed to 2 mm the resistance changes to 1.5 k Ohms. FIG. two depicts pictorially the range of deformation of the foam, wherein the open cellular array of foam material is depicted clearly at the right hand side of FIG. 1 and as the depression distance increases the foam thickness decreases as the gas within the cellular array is expelled and the walls of the cells deform. In this embodiment the gas expelled is the atmospheric gasses referred to as air. Other foam embodiments may use a closed system and the gasses may be specifically chosen for the application to hand.

One way of converting the measurement is to use a voltage dividing circuit and an analogue-to-digital converter (ADC) to calculate the then current size of the foam sensor. The ADC is connected to an MSP430 microcontroller allowing those real-time readings from the foam sensors to be processed and sent in digital form to a computer device which includes memory, a Central Processing Unit and programs to run the computer to store and further process the digital form of the measurements taken.

Figure 3:
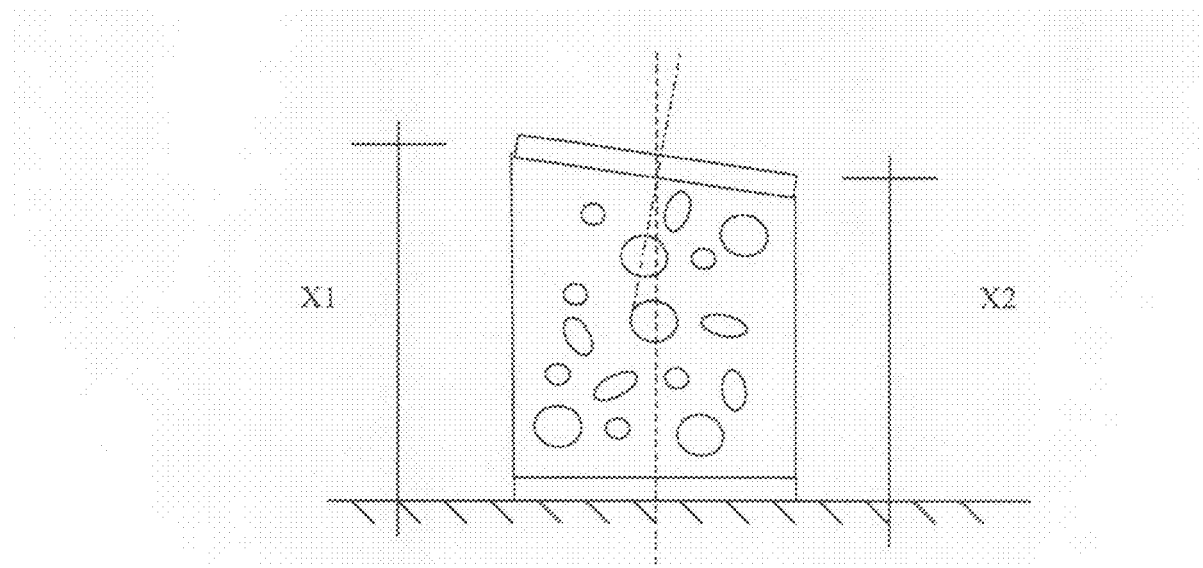
FIG. 3 depicts the sensor of FIG. 1 showing the result of an off-axis application of tactile force.

FIG. 3 depicts the deformation of the sensor which is not along the axis but it will be noted that there is still a deformation of a portion of the conductive elastomeric material as illustrated by the distance X1 being larger than the distance X2 and more importantly there is a change in at least one of the electrical characteristics of the conductive elastomeric material, such as in this embodiment the resistance.

Figure 4:
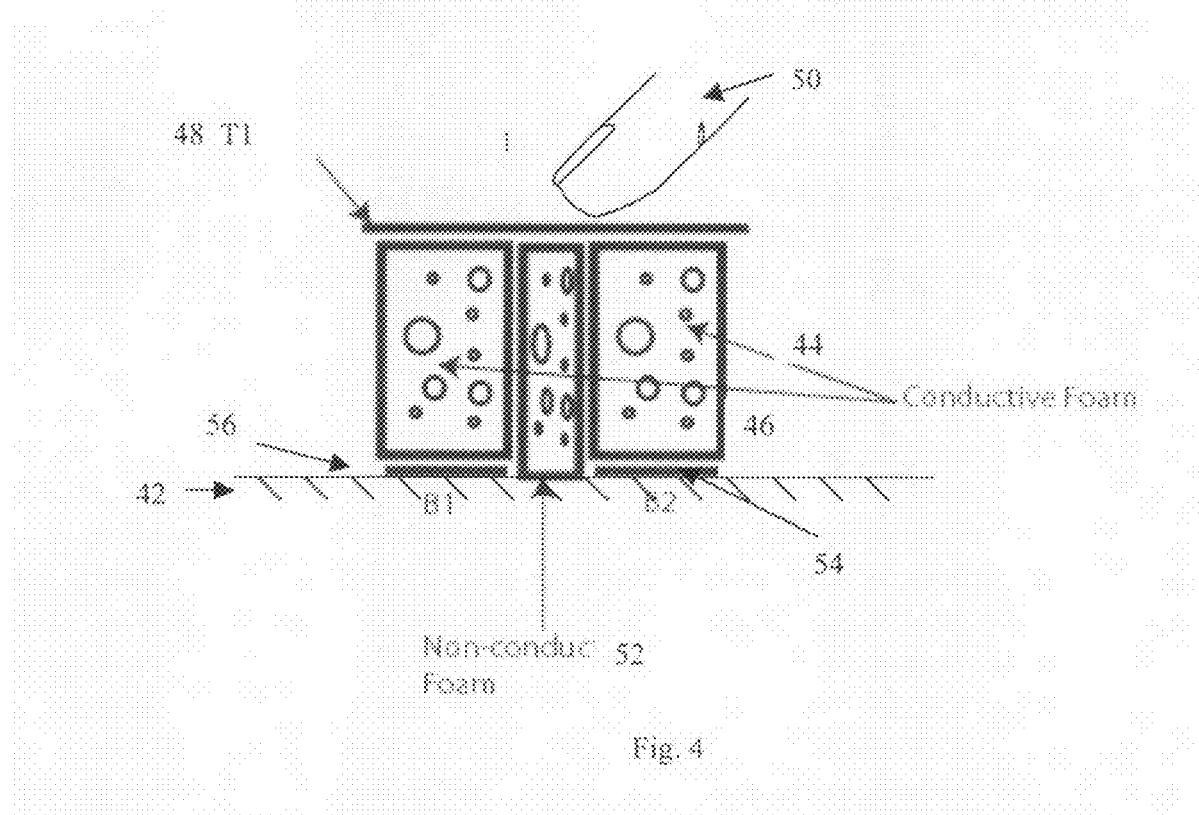
FIG. 4 depicts a pictorial representation of an embodiment of a dual sensor arrangement.

FIG. 4 depicts a haptic sensor arrangement 40 located on a supporting substrate 42 for tactile actuation from above the sensor arrangement. The arrangement includes, at least two spaced electrically conductive elastomeric members 44, and 46 in this embodiment conductive foam, wherein each member is elastomeric along at least one axis (as depicted by the vertical dotted lines). The electrically conductive elastomeric members have at least one electrical characteristic that changes when the elastomeric member is compressed along the least one axis by a force, such as a tactile force which has been used as an example and described earlier in this specification. Each sensor is located at a known position with respect to the supporting substrate. A tactile force transference member 48 is located over and between each sensor such that the tactile force transference member is arranged to change an electrical characteristic of at least one sensor in response to a tactile actuation, such as being depressed by a finger 50 of a user of the sensor arrangement.

The tactile force transference member 48 in this embodiment is a stretchy conductive fabric and the feel of the combination of the fabric and the elastomeric members assists in the feel of the sensor arrangement and in particular the feel of the elastomeric members.

Also depicted in FIG. 4 is one portion of a non-conductive elastomeric material 52 which has substantially the same elastomeric response characteristics as the conductive elastomeric members 44 and 46 arranged to substantially fill the volume between spaced conductive elastomeric members and electrically isolate the conductive elastomeric members from each other.

The isolation provided by this non-conductive member is not absolutely required as interference, noise and shorting of elements can be modeled out or used to reduce the level of such otherwise negative affects.

Two separated electrical terminals 54 and 56 are arranged to be in conductive contact with the conductive elastomeric member and abutment with the supporting substrate, both being terminals between which resistance is measured when used in conjunction with and in electrical contact with, either a single conductive tactile force transference member 48 (as depicted in FIG. 4 and which can be a conductive fabric) or individual electrical terminals (as will be depicted in other figures associated with another embodiment) and the conductive elastomeric members 44 and 46. Measurement of the chosen electrical characteristic can be made between the terminals 56 and 54 and the conductive fabric 48.

Figure 4A:
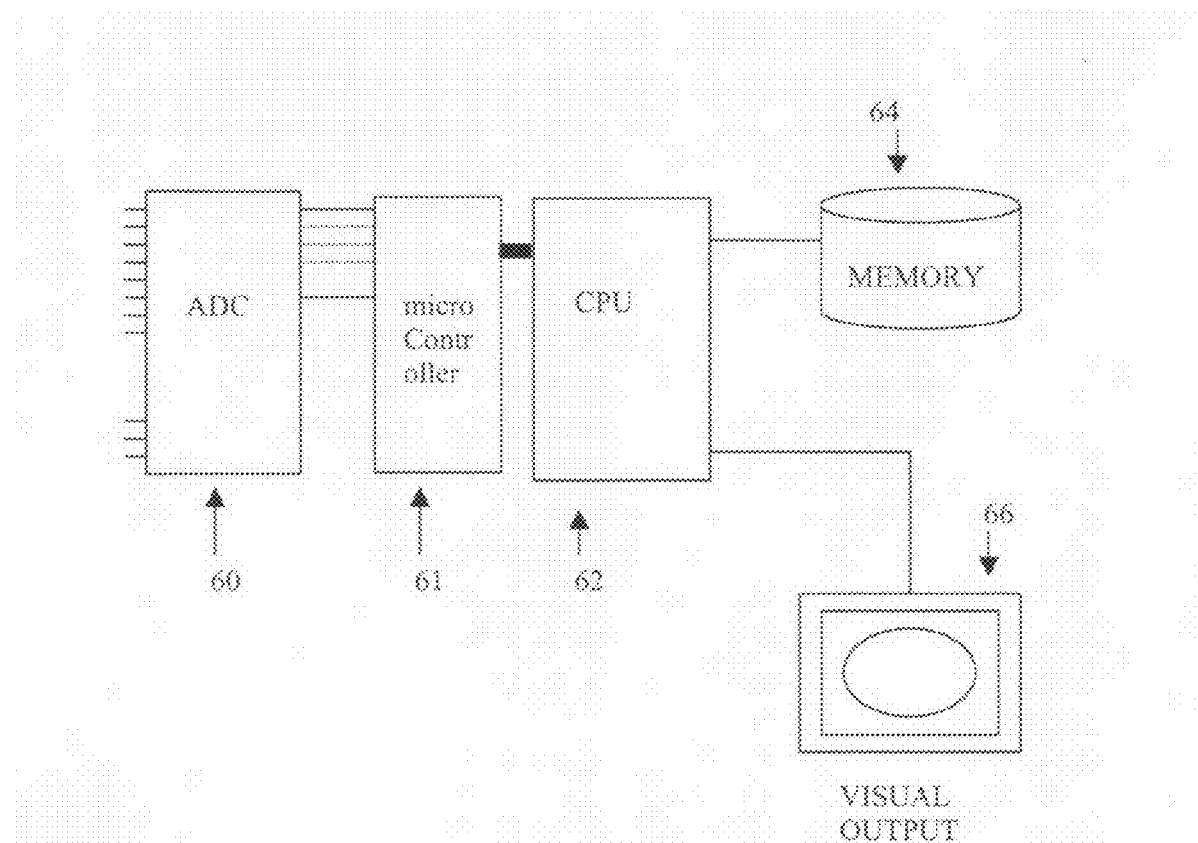
FIG. 4a depicts a pictorial representation of a computer device used in association with a sensor arrangement.

FIG. 4a depicts and ADC 60, a micro-controller 61 and a processor 62 with associated memory 64 and visual display 66 for transforming the electrical measurements of the electrical characteristic of each sensor and for determining a distance between the tactile force transference member 58 and the supporting surface 42 (or any other relative surface or reference point or area, as the adjustment can be readily performed by one skilled in the art), and using the known spacing between each actuated spaced conductive elastomeric members to determine the position and displacement of the actuation with respect to the supporting substrate.

For ease of use the term "Digital Foam" will be used to refer to this embodiment but it not in any way meant to be limiting on the material used for the conductive elastomeric member.

Figure 5:
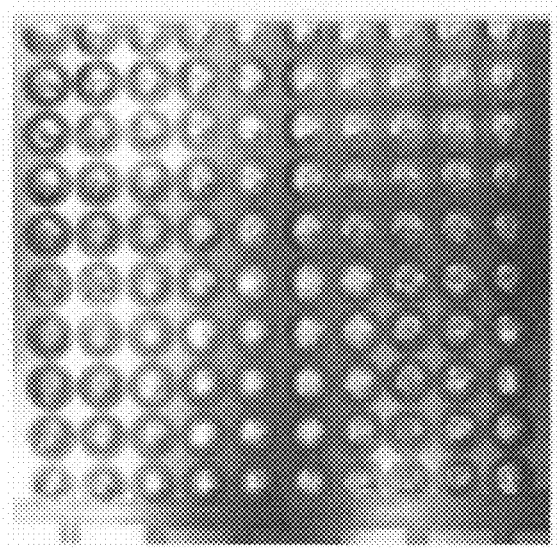
FIG. 5 depicts a picture of an embodiment showing a PCB array of conductive terminals.
Figure 6:
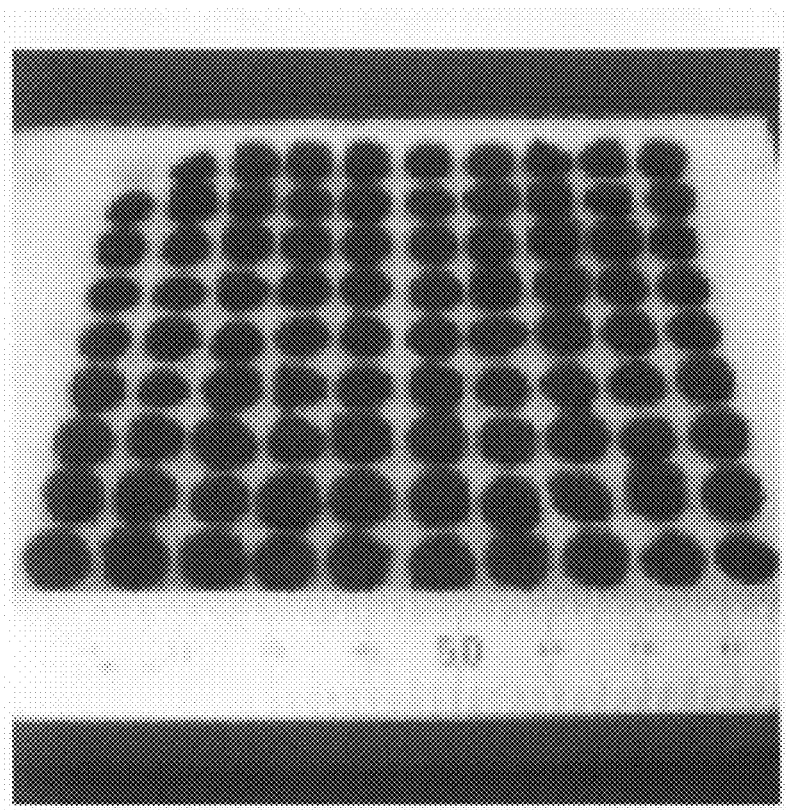
FIG. 6 depicts a picture of the embodiment associated with FIG. 5 showing electrically conductive elastomeric members.
Figure 7:
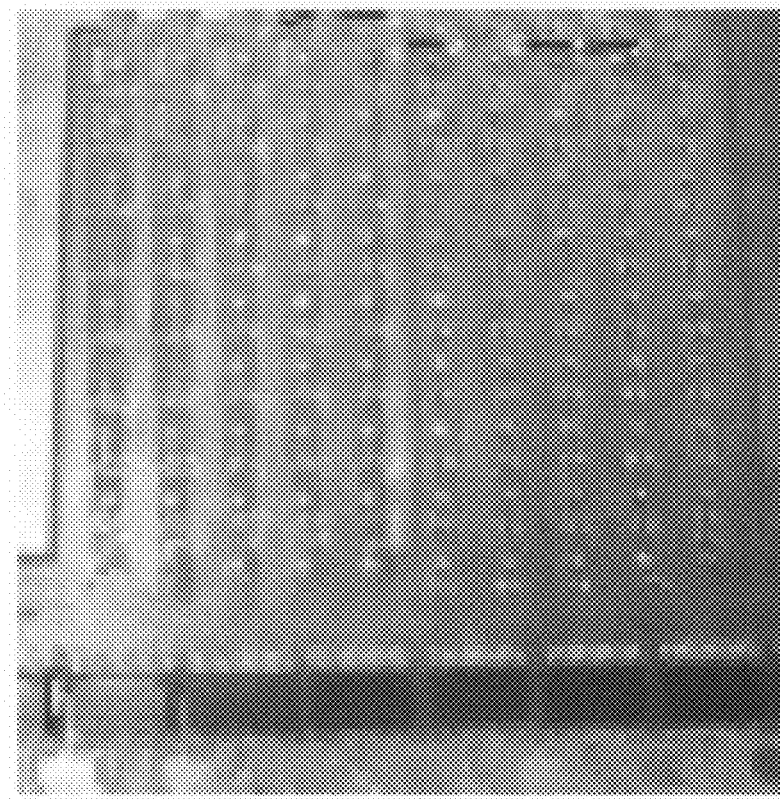
FIG. 7 depicts a picture of the embodiment associated with FIG. 5 showing non-conductive elastomeric material.
Figure 8:
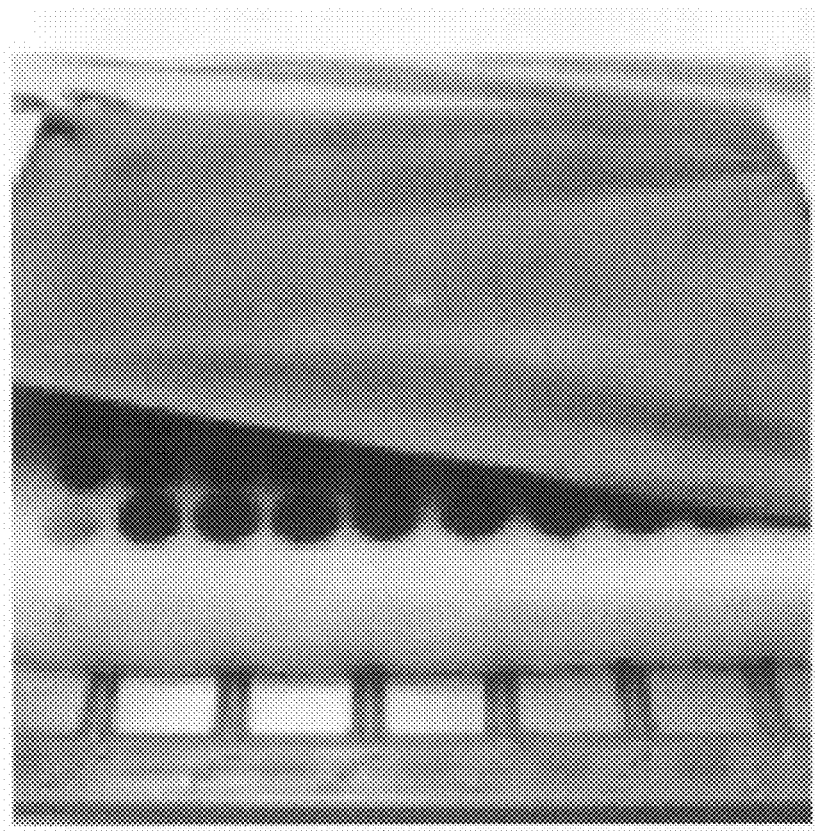
FIG. 8 depicts a picture of the embodiment associated with FIG. 5 showing the covering of the partially assembled sensor array with tactile force transference member being conductive fabric.

The embodiment shown in FIGS. 5, 6, 7, 8 and 9 uses one hundred (10×10) foam sensors as depicted in FIG. 6 producing a 90 mm×90 mm working area and a working depth of 20 mm. This was chosen so that the construction was not too complex while at the same time providing sufficient resolution to allow multiple fingers to press the foam surface without overlapping. One hundred terminals were etched onto a printed circuit board (PCB) as shown in FIG. 5. If a single un-insulated conductive foam piece was used over the hundred terminals, co-incident in time multiple depressions of the foam provide a shorter path of resistance and an incorrect reading can be measured. To overcome this limitation, a custom piece of foam that combines ordinary non-conductive polyurethane with conductive polyurethane FIGS. 6 and 7 provides an insulation layer for each discrete sensor so as to remove or reduce the interference possibility associated with closely located sensors. A sheet of conductive fabric was laid over the top of the sensor array to complete the circuit.

Figure 9:
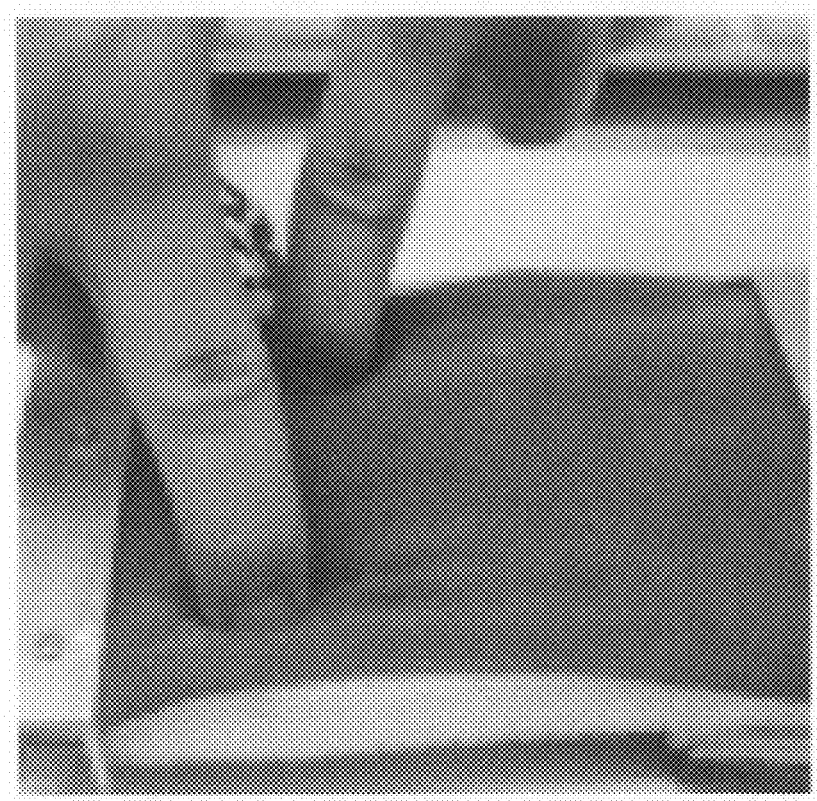
FIG. 9 depicts a picture of the embodiment associated with FIG. 5 showing the use of a sensor array by a user.
Figure 10:
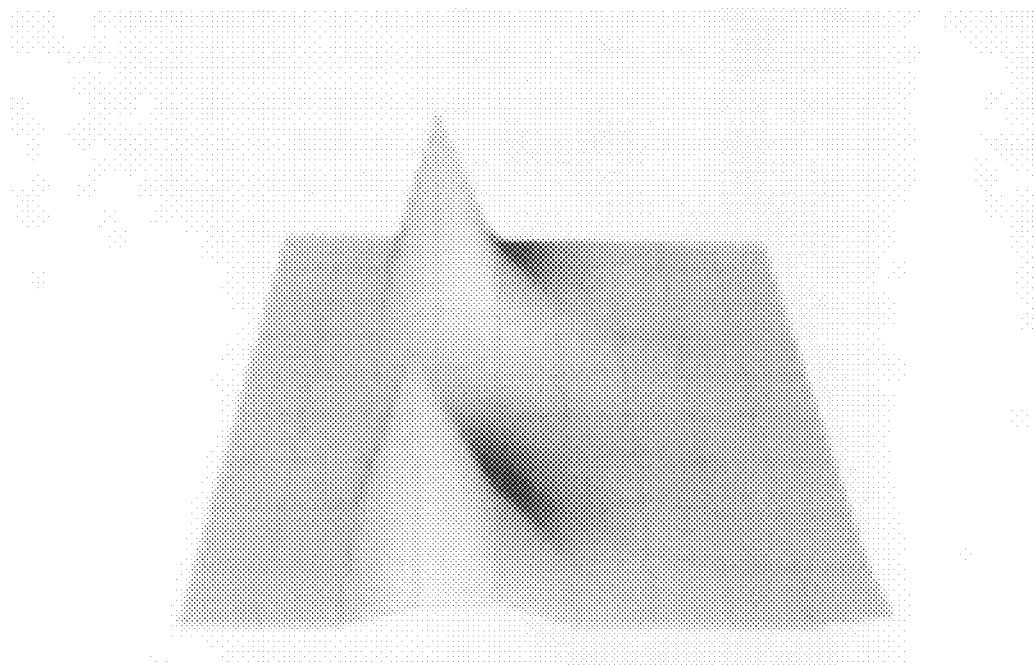
FIG. 10 depicts a digitally created representation of the tactile depression of the embodiment associated with FIG. 5.

The final input device is show in FIG. 9 where a user is shown depressing two separate locations with their index fingers. The corresponding geometry shown in FIG. 10 is a digital representation of the surface of the conductive fabric covering but is inverted to avoid occlusions in the figure and to verify two finger presses are visible.

Even having a working area large enough to have two users operate the input device with both hands it was still possible to avoid overlapping on the resulting digital representations of the tactile geometry of the conductive fabric covering. Since the flat form of the Digital Foam senses each point associated with a terminal separately, the processing output shows no shadowing effects as can occur with standard touch screens.

It is possible to array multiple copies of a Digital Foam sensor array side by side. This combination of multiple flat Digital Foam arrays can be scaled up to areas large enough to cover table top surfaces with such sensors.

Each of the foam sensors is attached to a 10-bit ADC. The length of the foam sensor determines the resolution achieved. Given a 20 mm thick piece of foam, a 10-bit ADC provides 1024 levels that change depending on how far the foam is depressed. The initial 20 mm thick foam size was chosen for ease of construction although we are currently experimenting with more precise electronics to help maintain the maximum resolution while increasing the operating length.

Sensor readings are transmitted at 30 Hz with a latency of less than 8 ms with one hundred sensors. As the number of foam sensors increases additional ADC's channels are required increasing the read time. As the number of foam sensors is increased additional ADC's are required increasing the sequential read time.

3D geometry creation often starts with a base shape on which carving and other operations are performed to generate a sculpted solid.

Constructing a multi-sensor arrangement in a spherical shape as is the form of the embodiment described herein has difficult technical problems to overcome.

Figure 11:
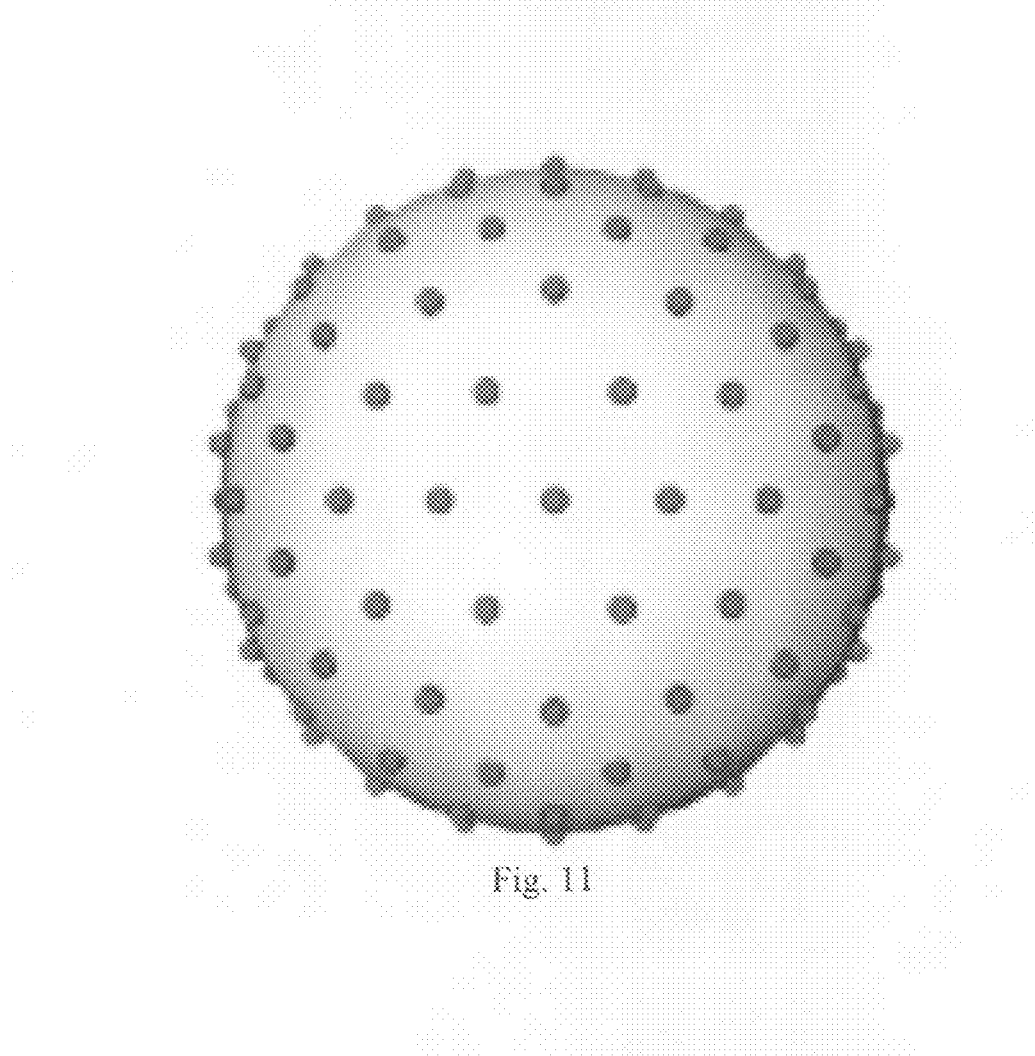
FIG. 11 depicts a perspective view of the layout 162 evenly spaced sensors on a sphere's surface generated using a subdivision algorithm.

First, constructing a foam surface in a sphere shape with a large number of sensors requires custom construction techniques to be developed. The position of the sensors is preferably placed equidistant about the sphere's surface. A subdivision algorithm and a repelling algorithm were used. The subdivision algorithm generates perfectly evenly spaced vertex locations but only certain numbers of vertices are possible. The algorithm starts with one of the five platonic solids and is reduced by dividing each face into four new faces until the desired complexity is reached. By choosing different base platonic solids and performing different division levels there are a large number of evenly spaced vertex spacing's can be generated. Alternatively a repelling algorithm can generate "almost evenly spaced points" with N vertices. The subdivision technique was used to determine the location of the 162 sensor embodiment disclosed. An icosahedron (20 faces, 12 vertices and 30 edges) was chosen as the base shape and performed 2 levels of subdivision so the final shape has 320 faces, 162 vertices and 480 edges. The sensor layout is shown in FIG. 11.

Figure 15:
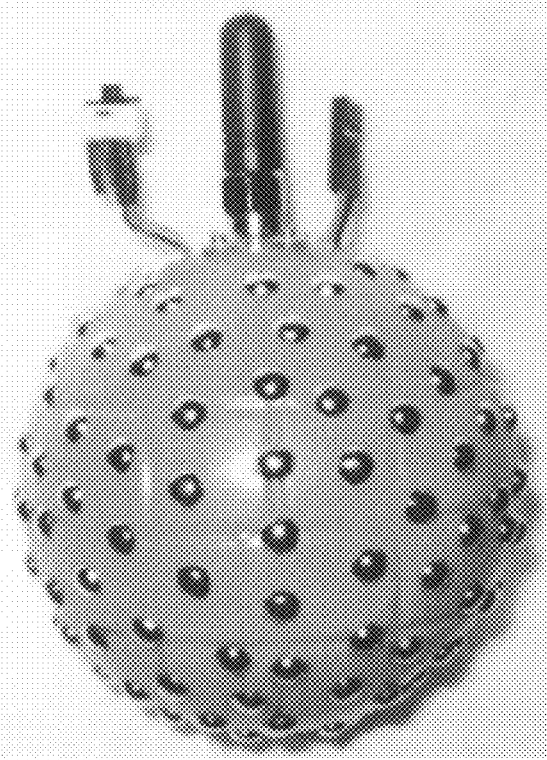
FIG. 15 depicts a perspective view of the digital foam sphere showing external electrical terminals, and on/off switch, antenna, and charging port.

Secondly, the digital converters (ADC's) in a confined location technically required very careful design and construction to accommodate the dense electronics. The electronics used in the 162 sensor Spherical Digital Foam embodiment ADCs were used to measure the resistance of each conductive foam sensor. In total there are 16 TLV1543s each with 11 channels that allow the capture of a 10 bit sample for each of the 162 foam sensors (Exposed sensor terminals shown in FIG. 15. Separate boards were created for each ADC chip and attached to the inner surface of the plastic skeleton; this was done to optimize space usage within the sphere. Each ADC chip is connected to a common serial data bus that is managed with a Texas Instruments MSP430F1232 microcontroller. Wireless communications to the microcontroller are performed using a Parani-ESD210 Bluetooth module which has an external antenna. All communications to the Digital Foam are performed over a Bluetooth connection when a corresponding device is embedded or associated with each Digital Foam input array. Each Digital Foam input array has its configuration stored on the associated hardware. When a connection is made, the configuration describing the device's shape, sensor locations, and a tessellation order is provided.

Figure 16:
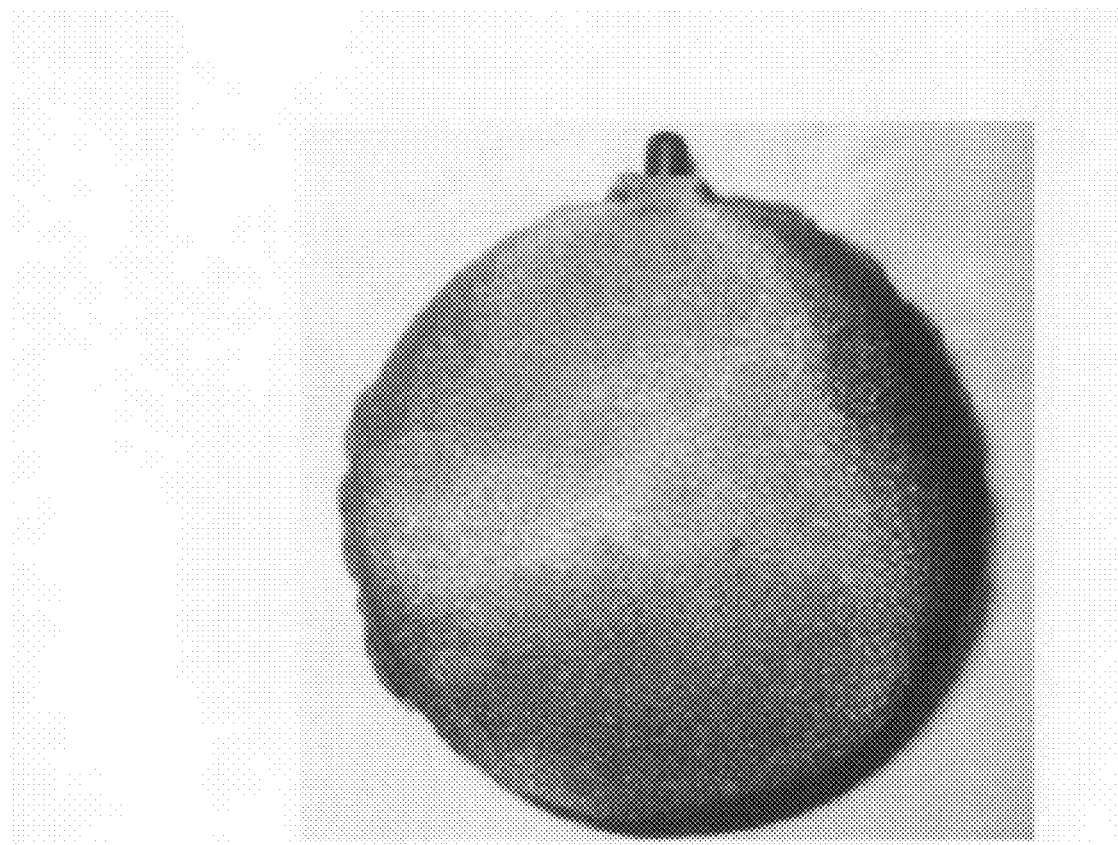
FIG. 16 depicts a perspective view of a fully constructed spherical digital foam input device.

An external antenna protrudes though the conductive fabric outer FIG. 16. Signal loss is not a problem using the external antenna but an internal antenna is not excluded from future designs. Since the conductive fabric is connected to a ground signal and as such acts similar to a Faraday cage blocking wireless signals. To allow a wireless connection it is possible to provide spaced holes in the conductive fabric for allowing a 2.4 GHz Bluetooth signal to be transmitted for both the foam and orientation sensors. The external antenna location of the described embodiment also doubles as a reference orientation marker as will be discussed.

The sphere contains a MSP430F1232 a microcontroller, ADC, Intersense Inertia Cube 3 available from {http://www.intersense.com/}, a 600 mAh Lithium Polymer battery, and Bluetooth wireless electronics. An ON/OFF switch, exposed connection terminal and a battery charging terminal is shown external of the isolated sensor covered sphere in FIG. 15 which can be accessed when required as they would reside within the sphere during use.

Figure 13:
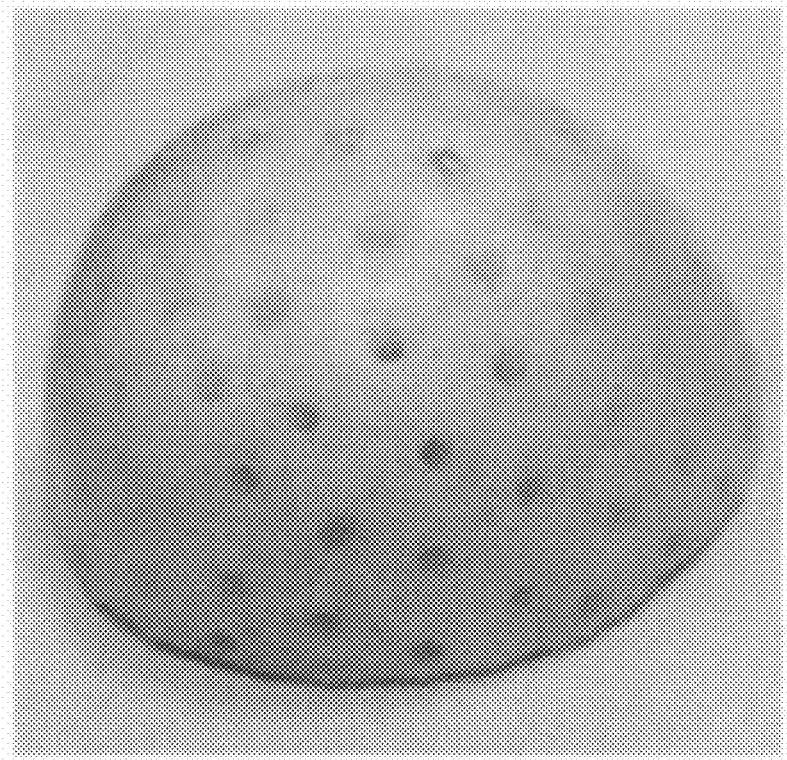
FIG. 13 depicts a perspective view of a custom cast foam insulation.
Figure 14:
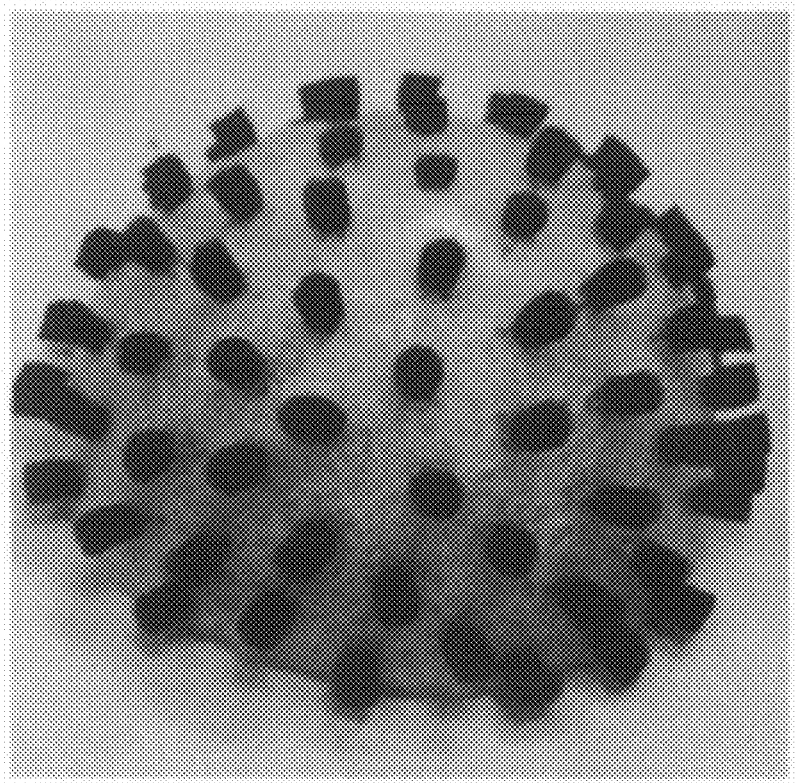
FIG. 14 depicts a perspective view of an array of conductive foam inserts inserted into a foam mould.

The foam sensors attached to the supporting sphere are depicted in FIG. 14, the insulation cover of FIG. 13 fitted about the foam sensors is depicted in FIG. 13, and the final shape showing the conductive fabric outer is shown in FIG. 16.

Figure 12:
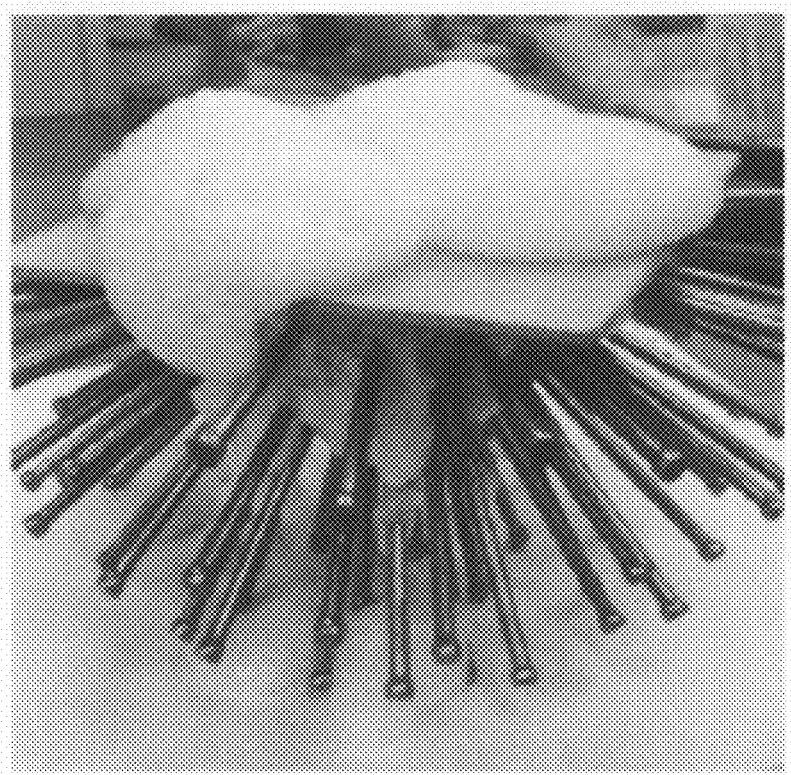
FIG. 12 depicts a perspective view of a custom mould used for casting foam.

Insulating the individual foam sensors and maintaining good contact at the termination points is critical to the performance of each sensor. One method of positioning sensors is for each sensor to be separately attached a plastic sphere. This approach is tedious and not scalable as the number of sensors is increased. The embodiment described uses liquid foam poured into a custom mould (as shown in FIG. 12. Smooth On's FlexFoam-iT! {available from http://www.smooth-on.com/} liquid foam was poured into the custom mould to create the insulating and structural part of the foam sensor as shown in FIG. 13. Once the moulding process is completed, individual conducting foam inserts are placed into each of the holes FIG. 14. The insulating part of sphere's foam surface is created in two halves to ease the complexity of construction and allow assembly and disassembly of the device.

To reveal Digital Foam's potential an interaction technique to support 3D modelling has been developed. For the purposes of the development the assumption was used that Digital Foam would be used as a sole input device. The outcome is a technique for modelling and interactions that can be performed without the need for a keyboard or mouse, a common requirement when using virtual and augmented reality systems. This also removes the need for the user to put the input device down to free their manipulating hands to use a keyboard or mouse instead of the in hand input device. Although speech input is a possible command entry technology, a single device for command entry and direct manipulation of the object's surface was deemed necessary.

The Spherical Digital Foam input device can be used with interaction techniques that support 3D modeling operations. Firstly we have an option to load existing 3D models into the application. A user can now begin the modeling process with either the reconstructed shape generated by the hardware device or by loading an existing 3D model. To allow manipulations to be performed on existing models the Digital Foam sensors are mapped to locations associated with the model allowing semi-direct manipulation to be performed. The mapping is described as semi-direct because the input device shape is not the same as the 3D model. However a spatial mapping is maintained between the two.

Figure 17:
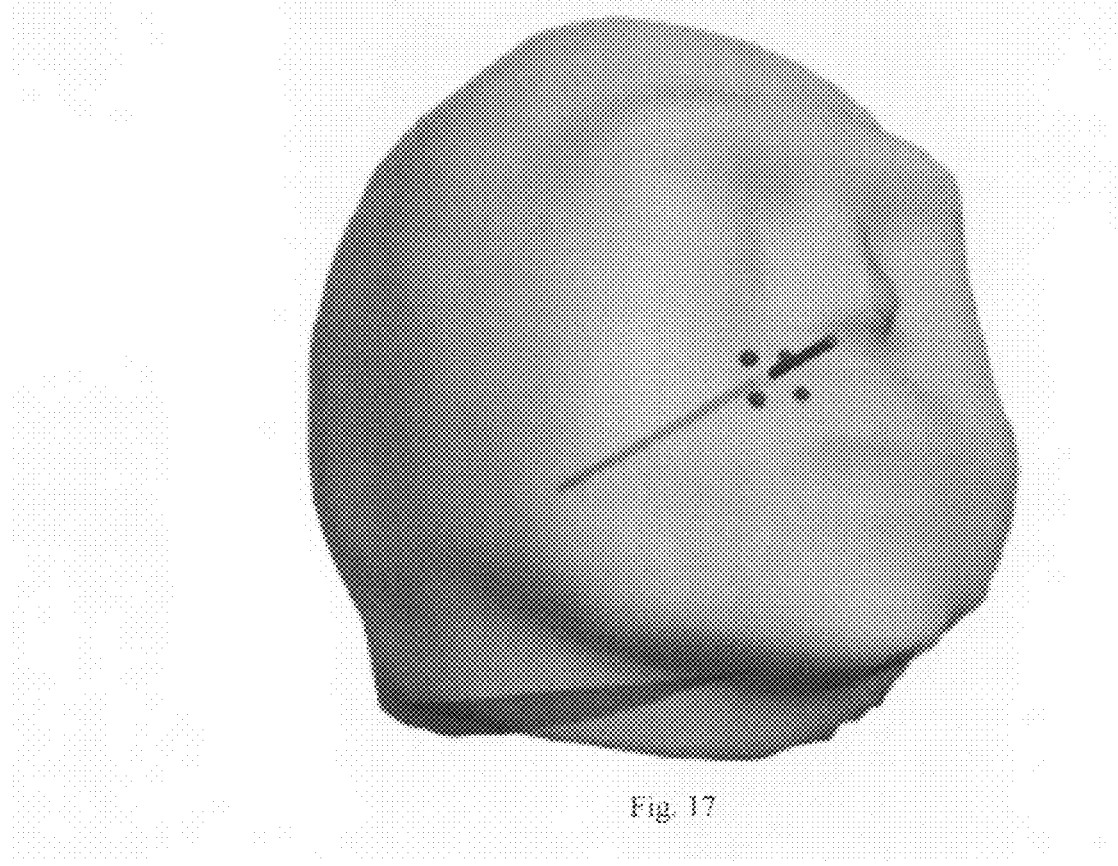
FIG. 17 depicts a perspective view of a digital representation of a three-dimensional form showing ray intersection and surrounding vertices calculation representation.

To achieve the mapping between the 3D model and Digital Foam form, a set of rays aligned with each of the conductive foam sensors are cast from the centre of the 3D model to find the intersection points on the outer surface of the 3D model FIG. 17. Once each intersection point is found, an index to each vertex is stored for later use. The length of each Digital Foam sensor is mapped directly to these intersection points, as described in Equation 1 below, allowing the user to modify the 3D model by pressing on the Digital Foam surface. The new vertex location P' is found by translating the original position P in the direction of the ray using the foam length as the scalar value.

$$P' = P*(su*fl) \qquad \text{Equation 1}$$

where,
P=Intersection point on model's outer surface.
fl=Current length of the foam sensor.
su=Normalized Digital Foam vertex location.

To increase the working area between sensor points an algorithm is applied to find the closest surrounding vertices within a user defined radius. After calculating the surrounding vertices for each intersection point and storing them in ascending order based on length from the intersection point (P) to each vertex (V) on the model. For each vertex (V) within the user defined radius we find V' (the set of new vertex locations) by scaling the foam length (fl) by length between the intersection point (P) and the vertex V, see Equation 2, below. The furthest vertex within the predefined radius has no modification, generating a curved indentation shape used to perform sculpting FIG. 18.

$$V' = V*((su*(fl*|fd-vd|^2 *c)) \qquad \text{Equation 2}$$

where,
V=Current vertex.
su=Direction pointing out from the centre of the model.
fd=Length from the furthest vertex to P.
vd=Length from the current vertex to P.
c=Scale factor.

Figure 19:
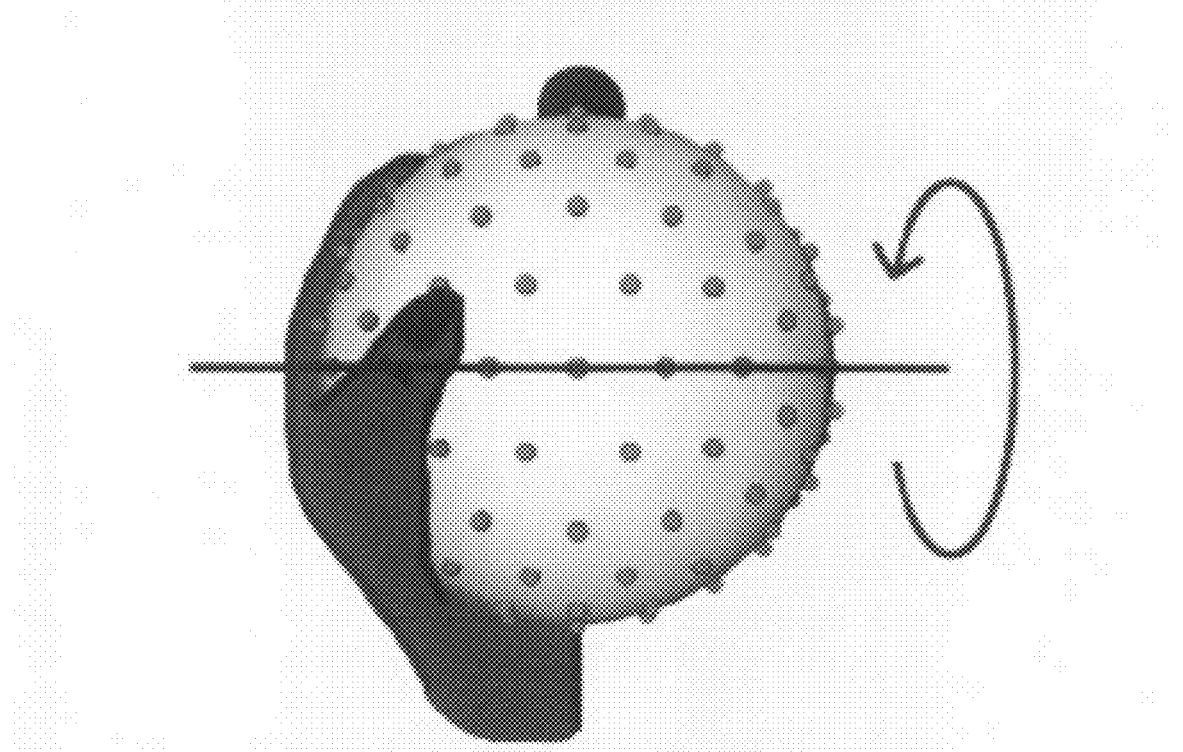
FIG. 19 depicts a perspective view of a clutching tilt operation to reset the vertex locations.

The Spherical Digital Foam employs a tilt based clutching mechanism to allow accumulative modeling operations. A user performs a sculpting operation by pressing the foam to the desired location, tilts the prop approximately 20 degrees, and releases their finger. Each of the vertex positions is stored and the process can be repeated using the clutching operation shown in FIG. 19.

Figure 18:
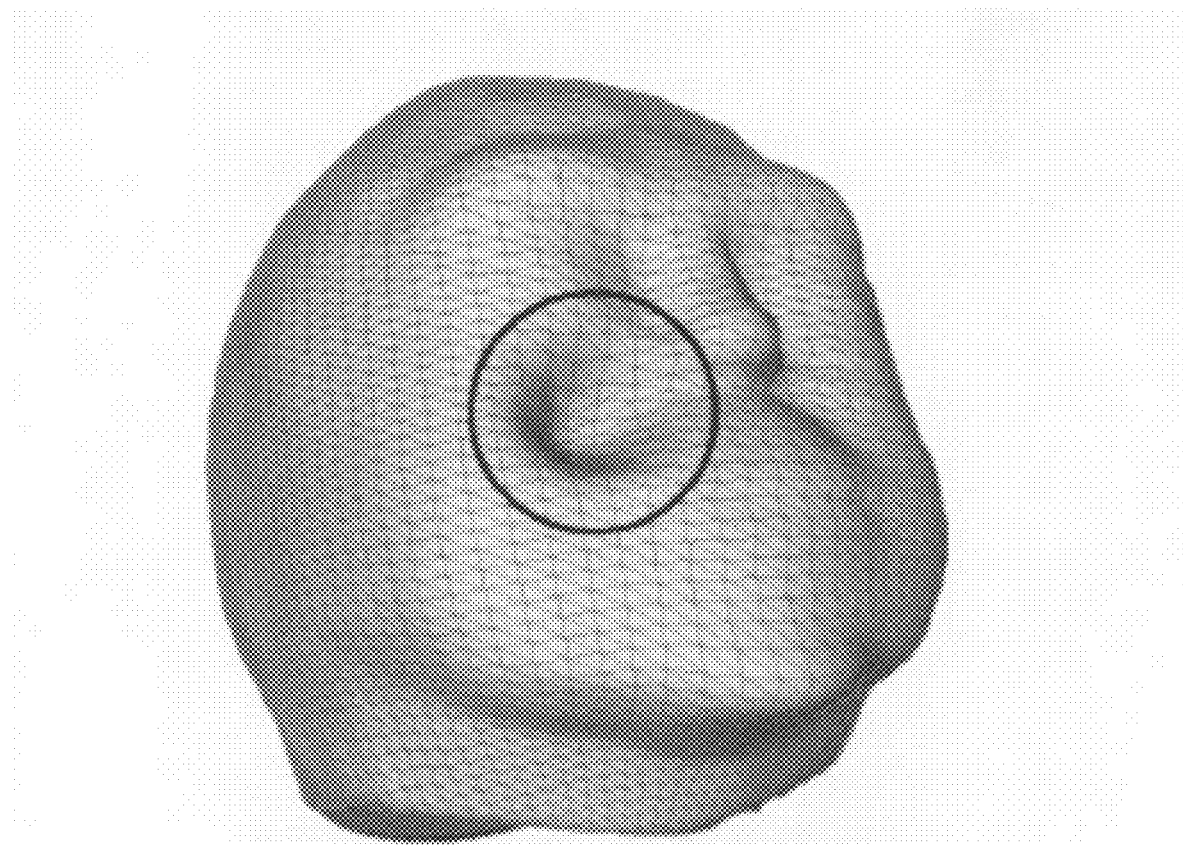
FIG. 18 depicts a perspective view of a digital representation of a three-dimensional form showing the resulting geometry after a single clutched free-form sculpting operation, as shown in FIG. 19.

Manipulation direction (push in or push out the 3D virtual model) can be set allowing the inverse operation to be performed, since artists commonly attach and detach clay to a physical model during its creation. The user can change the direction by toggling a menu option. The combined techniques discussed here allow the modification of vertices to be either additive or subtractive. FIG. 18 shows a resulting sculpting operation depressing the left cheek of the digital representation.

Figure 23:
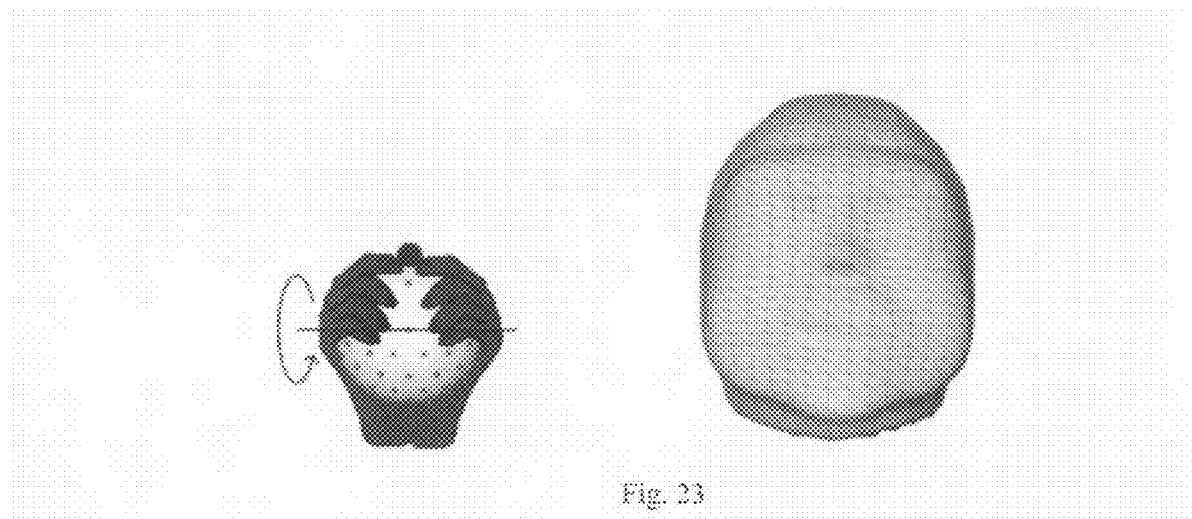
FIG. 23 depicts a menu operating procedure with the user interaction pose illustrated adjacent the interaction mode digital representation.
Figure 24:
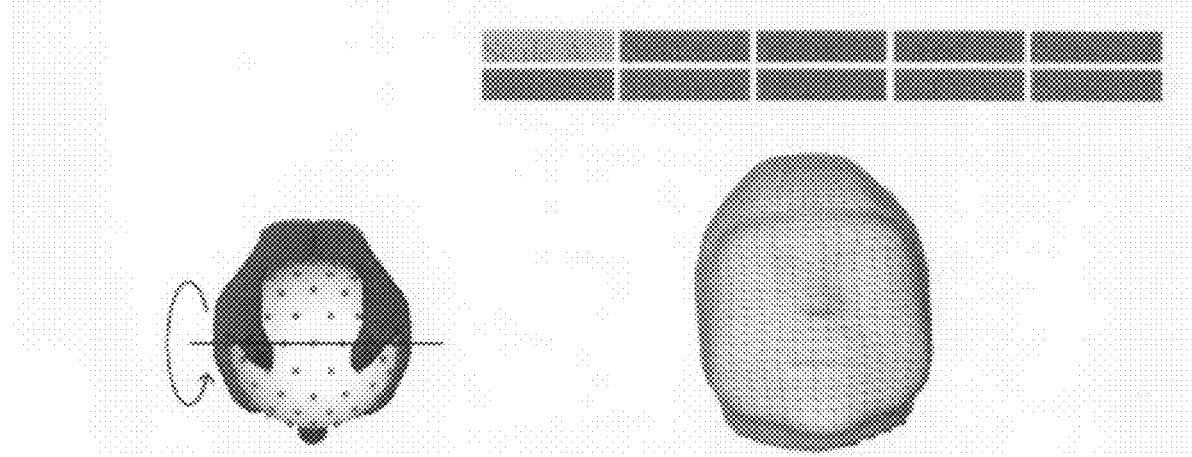
FIG. 24 depicts a menu operating procedure with user interaction including a rotation of the prop upside down along with the appropriate menu selection highlighted.
Figure 25:
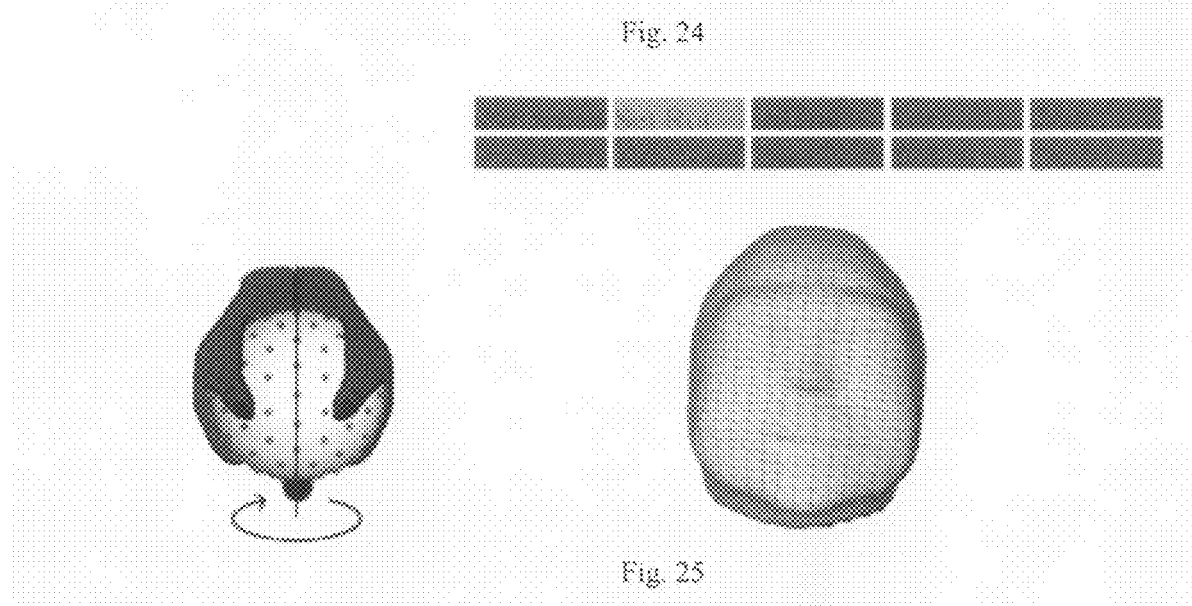
FIG. 25 depicts a menu operating procedure with user interaction including the use of a rotating the prop around a heading so as to select different menu options with the appropriate menu selection scrolling in concert with the actions.

One method of manipulating a computer menu used to operate and interact with the haptic input device includes the steps of applying a tactile force to one or more locations on the haptic input device to select a menu input mode in the associated computer, orientating the haptic input device to change the menu selection; and applying a further tactile force or removing a previous tactile force to make the menu selection. The FIGS. 23, 24 and 25 illustrate embodiments of the basic functionality of such steps, which are described in greater detail later in the specification.

Some general observations can be made about the design aspects of Digital Foam. Unlike Surface drawing the user can begin their task with a fixed volume and perform sculpting operations immediately. This approach emulates clay sculpting using a single solid piece of modeling clay.

Figure 20:
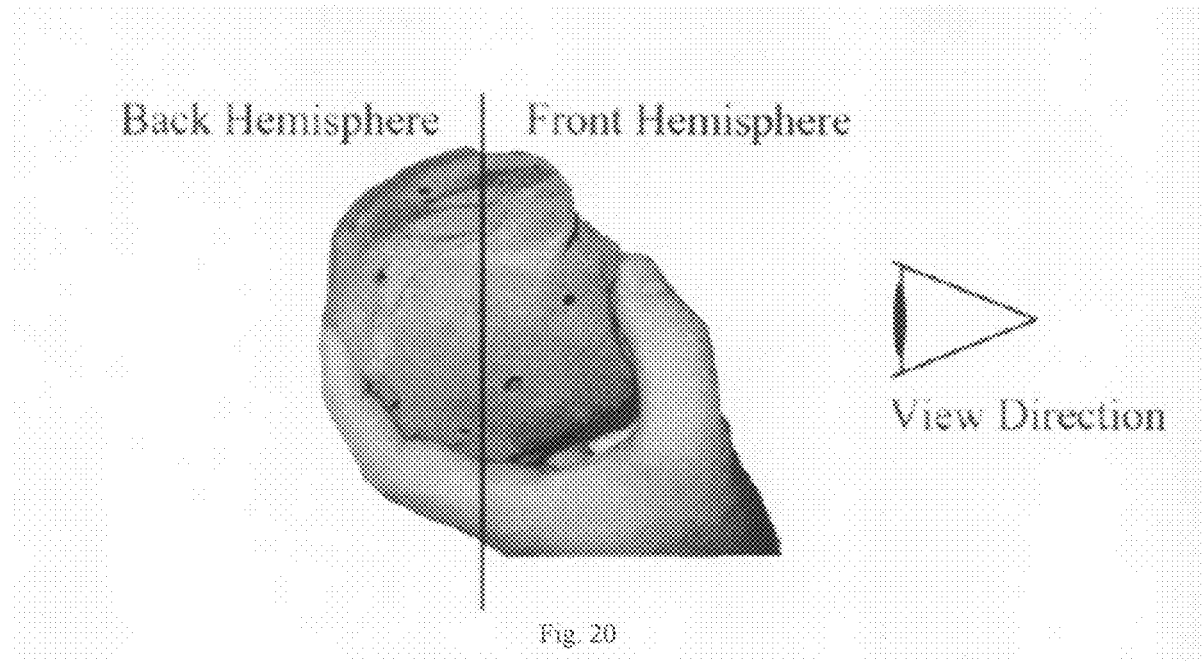
FIG. 20 depicts an illustration of the half hemisphere technique where the user performs sculpting with farm, and unwonted finger presses at the back of the sphere in the back hemisphere.

A Digital Foam input device can be used with Surface Drawing techniques and it is envisaged that a new sense of control could be added so as to allow larger surface areas to be modified perhaps in a collaborative manner. Furthermore, the user does not need to see the prop while manipulating it and there are no erroneous effects with the haptic feedback. Yet further, Digital Foam can capture the fingertip location When holding a Spherical Digital Foam input device, a user's fingers and thumb may cause depressions in more than one location on the foam surface. This is problematic when free-form modeling, as these could be interpreted as unwanted modeling gestures. For example, when a user performs sculpting operations at the front of the sphere using their thumbs, their fingers are located at the back of the sphere causing depressions at both the front and the back as shown in FIG. 20.

Figure 21:
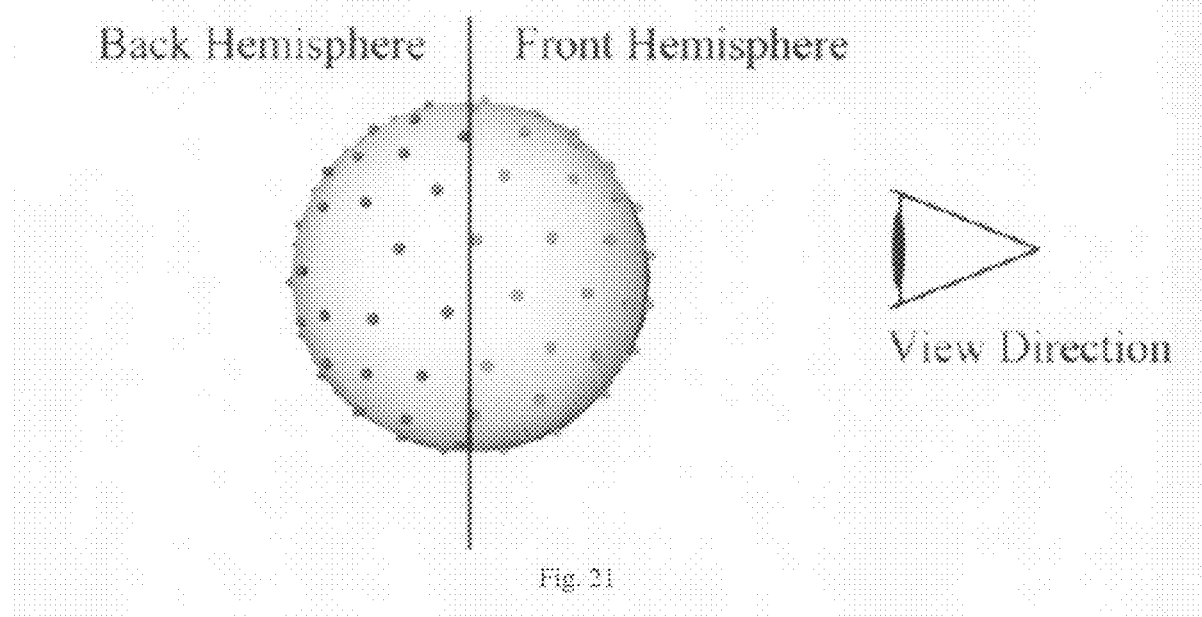
FIG. 21 depicts an illustration of the half hemisphere correction being performed, with active vertices shown on the right side, in active vertices shown on the left side.

The technique developed divides the sphere's operation surface into two hemispheres, front and back. All vertices located on the front hemisphere relative to the user's view point remain active, while those behind are made inactive FIG. 21. On initialization, the user specifies the front orientation and can not move their head position or orientation during operation (Additional trackers are required on the users head and Digital Foam to achieve this). As the user rotates the Spherical Digital Foam input device the virtual model's orientation is updated in real-time using an internal orientation sensor. To maintain the half hemisphere operation, all vertices that are in front of the centre point are flagged as active while those behind are inactive. This operation overcomes a significant user interface problem when operating Digital Foam; thus allowing easier operation and increased control during modeling. The half hemisphere operation can be applied to work in conjunction with other techniques allowing stacked operations to be performed. For example, half hemisphere operation can be used with sculpting or menu click operations.

Figure 22A:
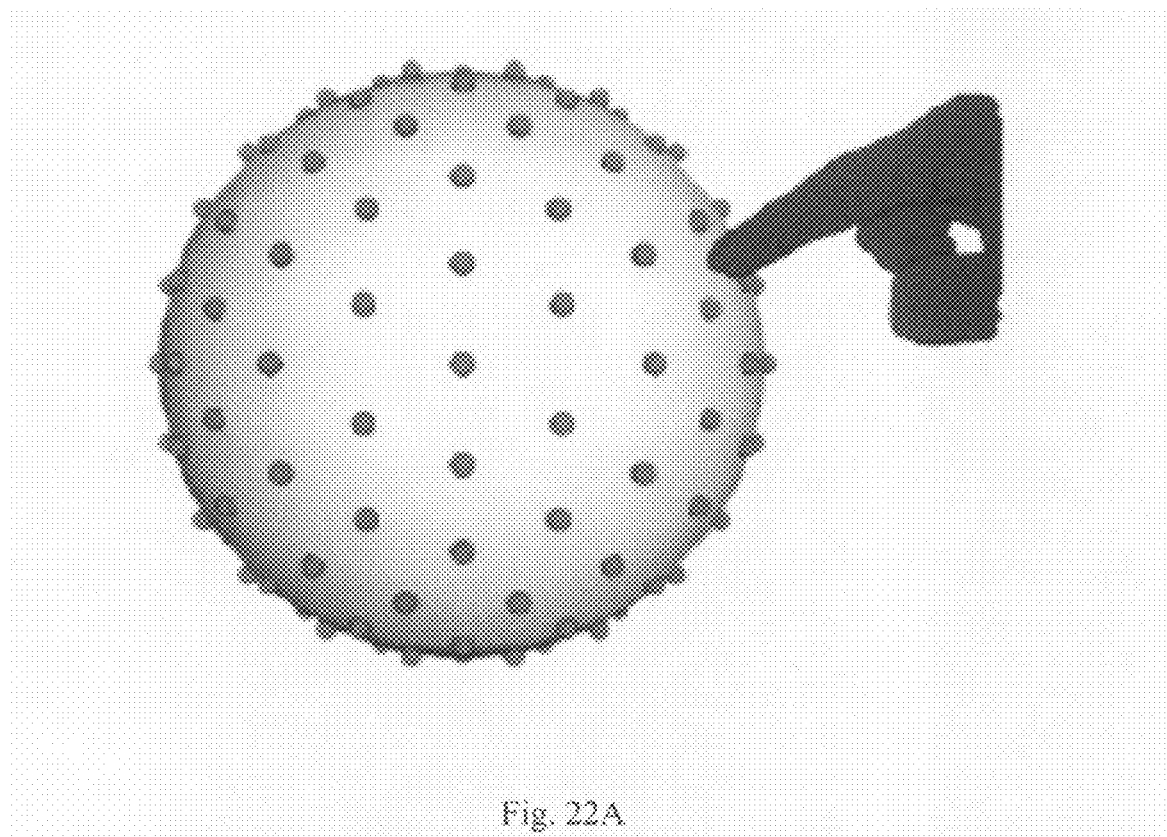
FIG. 22a depicts an illustration of a user controlling the camera location with press location, and zoom with pressure.
Figure 22B:
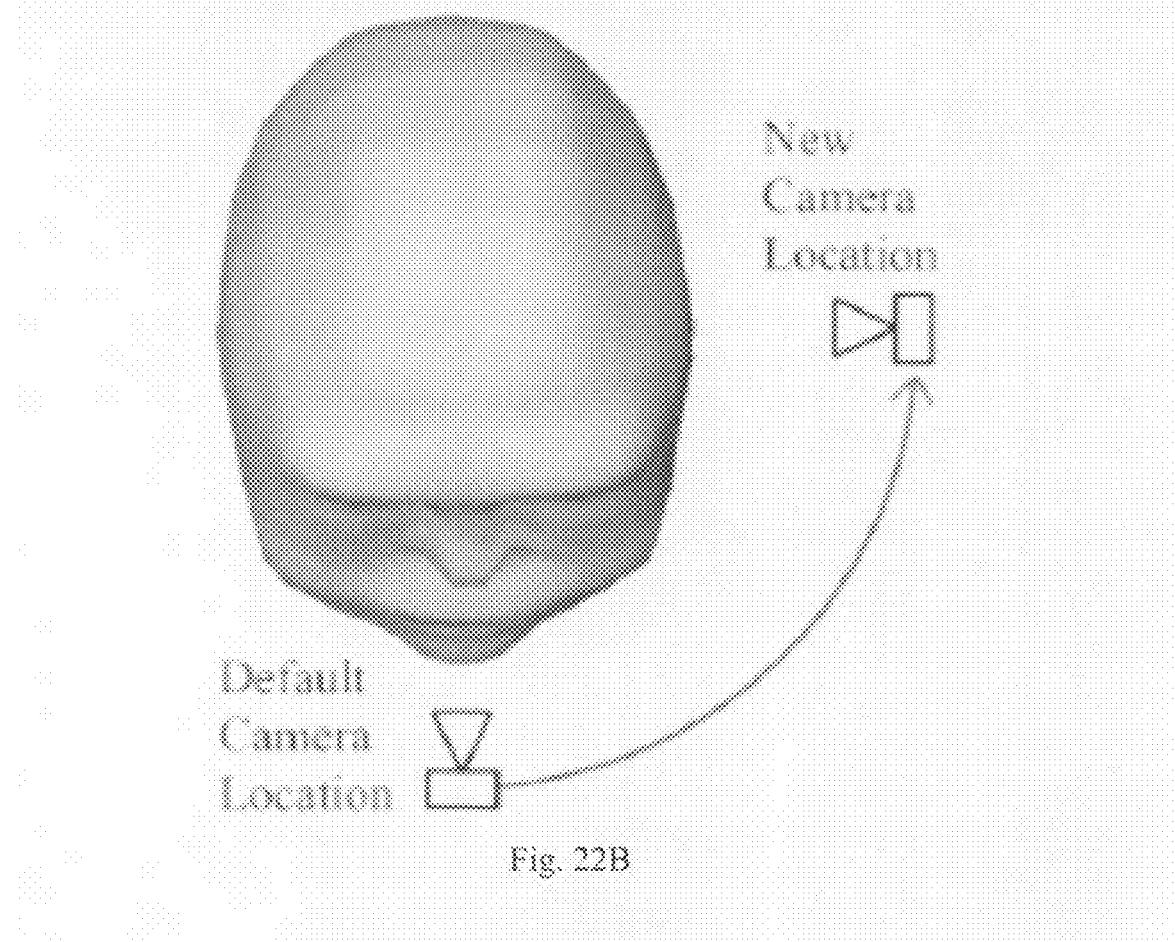

A camera view control technique has been developed allowing a user to quickly and intuitively move the virtual cameras position. FIGS. 22a and 22b depicts the operation of the Digital Foam sphere in the camera view control mode.

While in the camera view control mode, a user touches any part of the surface of the sphere and the camera viewpoint will be shifted to the matching location. When multiple sensor readings (depressions) are detected, the foam sensor with the shortest value is used to determine the camera position. The direction of the camera is determined in a similar fashion to an orbital view algorithm. A bounding sphere is created around the virtual model and the direction of the camera is set to look at the centre of the object. The user can also control the zoom of the camera based on the pressure of the touch. As the user pushes on the Digital Foam harder the camera zooms in closer and as the user releases the zoom location returns.

A custom menu system has been developed as the primary command entry technique used when operating the Spherical Digital Foam input device. The navigation of the menus is designed to be intuitive, quick and easy to use so as minimal user training is required. There are a number of challenges that need to be addressed to use Digital Foam as a sole input device for both command entry and direct manipulation. Such as free-form sculpting, camera view and all modes of direct model interaction are referred to as interaction modes. A technique is implemented that allows the user to transition from any interaction mode into a menu mode without using additional input devices.

To transition from interaction mode to menu mode the user rotates the input device up-side-down so the roll or pitch is beyond a predefined threshold value (currently set to 90 degrees and shown in FIG. 23. Once in the menu mode, the user can navigate through menus by rotating the input device around the heading (vertical) axis. There are 10 configured menu options allowing the user to select different interaction modes, but as the number increases, there can be additional hierarchical menus. To scroll through menu options a transition of 20 degree intervals has been chosen. When the user rotates around the heading axis the selected menu option changes from one menu option to the next every 20 degrees FIG. 25. Currently ten menu items are displayed on two rows with five menu items on each row. A transition from row one to row two occurs when the last item in row one is reached. By rotating the input device beyond the last item in row two a transition to the first row occurs.

Once the correct option is selected, a menu selection operation is required. To achieve this the Digital Foam sensors are actuated, by squeezing the input device with one or two hands a menu selection operation is performed. In software this is determined when the average value over all sensors drops below a predefined threshold and a click event is generated. Finally once the option has been selected and clicked, the menu is hidden and the selected interaction mode becomes immediately active.

To re-enter the menu mode, the input device orientation must first return so as rotation values are above the predefined threshold. Once this has occurred the device can be turned up-side-down again to enter menu mode. FIGS. 23, 24 and 25 shows the different states of the menu selection operation.

One limitation of this technique is that when operating in modes that map the orientation sensor directly to the model, the menu mode may be accidentally entered. Although this is a limitation, rotating around the heading is most commonly used for model navigation and both pitch and roll are unaffected until they pass the threshold value (currently set at 90 degrees).

This following disclosure presents a collection of common interaction techniques, such as rotation and scale. The Spherical Digital Foam has the unique feature of pressure sensing of the user's interaction, and an explanation of how to exploit this feature is presented.

There are two model rotation control modes disclosed. The first uses a direct mapping between the values of internal orientation sensor and the 3D model. The updating model rotation can be used in conjunction with other techniques such as free-form sculpting to adjust the current view angle. A menu option can be toggled to turn rotation on and off, however this mode is stateless and the model can not be set to a user defined position once this interaction mode is left.

To overcome this problem a second rotation control mode is available that allows a default rotation angle to be set. When using "set rotation" no rotation transformations are performed until the user begins squeezing the Digital Foam input device. When the desired operating angle is selected the user stops squeezing the input device and this angle is recorded and used as a default model orientation for all other interaction modes.

Scale functions of the model are used and there are eight separate scale operations. Each is activated by squeezing the Digital Foams surface to directly alter the scale value. The scale can be altered on X, Y or Z axis separately or a combined operation where the overall model's size is altered. The direction of scale can also be toggled via the menu.

Digital Foams' unique pressure sensing surface can gather pressure data that may be processed with different methods depending on the task being performed. Capturing the speed of a press for each separate sensor on the Digital Foam surface is possible. This is done by keeping a buffer for each foam sensor that records its distance and a time value. For example, keeping a ring buffer with a size of 20 is adequate to capture a range of button press/release speeds.

One limitation of the physical properties of the conductive foam is intense compression of the foam sensors has a slow return when depressed beyond approximately 80% of its original size. Avoiding the pressing of the sensors too hard or the use of a mechanical stop may reduce or avoid the described limitation.

When using the menu system, free-form sculpting or the camera view technique, it is useful to have a marker on the physical device to identify the top of the sphere. The physical marker can be the external antenna exiting point on the Spherical Digital Foam input device or if one does not exist then a physical marker can be placed on the sphere. A matching software marker can also be toggled on and off via the menu. This simple technique provides a spatial reference between the physical sphere and the representational 3D model.

The creation of an adequate resolution Spherical Digital Foam has inspired a technique that identifies unique areas of the foam's surface that can be configured in run-time to set up active regions for different operations. For example, the system prompts the user to configure a "left click", in turn the user would depress the desirable area of the spherical prop for their personalized "left click" operation. The application would then record the surface selected and the tactile force applied so that to interpret a "left click" operation appropriate force in a specific region will trigger the desired action using Hidden Markov Models to assist the transition from tactile force so the appropriate action can be applied.

It should be appreciated that the present invention can be implemented in numerous ways, including as a process, an apparatus, a system, or a computer readable medium such as a computer readable storage medium or a computer network wherein program instructions are sent over wireless, optical or electronic communication links. It should be noted that the order of the steps of disclosed processes may be altered within the scope of the invention.

What is claimed is:

1. A displacement sensor array comprising:
two or more conductive elastomeric members, each of which is elastomeric along at least one axis of the elastomeric member and has at least one electrical characteristic that changes when the elastomeric member is compressed along the at least one axis by a force, wherein the conductive elastomeric members have a known spatial configuration relative to each other and are not in physical contact with each other;
an electrically conductive first elastomeric terminal in electrical contact with all of the elastomeric members;
two or more second conductive terminals, each in electrical contact with a corresponding one of the elastomeric members, wherein each said second terminal is located on an opposite side of the corresponding elastomeric member than the first elastomeric terminal, along the at least one axis of the corresponding elastomeric member; and
wherein the known spatial configuration of the elastomeric members combined with the change in the at least one electrical characteristic of a respective conductive elastomeric member affected by a force applied to the first conductive terminal, determines the spatial location of the force relative to one or more of the conductive elastomeric members and relative to at least one of the second conductive terminals.

2. The sensor array of claim 1 wherein the first elastomeric terminal comprises a conductive elastomeric fabric.

3. The sensor array of claim 1 wherein the elastomeric members comprise a material having gaseous voids.

4. The sensor array of claim 1 wherein the electrical characteristics of the elastomeric members comprise one or more members of the group consisting of: voltage, current, resistance, dielectric constant, and capacitance.

5. The sensor array of claim 1 further comprising a non-conductive elastomeric material disposed between at least two of the conductive elastomeric members.

6. The sensor array of claim 1 further comprising a substrate on which two or more of the second conductive terminals are disposed.

7. A displacement sensor comprising:
a substrate;
at least two spaced apart and electrically conductive elastomeric members, wherein each of the elastomeric members is elastomeric along at least one axis and has at least one electrical characteristic that changes when the member is compressed along the least one axis, and wherein each of the elastomeric members is at a known spatial location with respect to the substrate;
an elastomeric electrically conductive tactile force transference terminal (TFTT) in electrical contact with each of the elastomeric members such that in response to a tactile actuation of the TFTT, an electrical characteristic of at least one of the elastomeric members changes;
at least two electrically conductive terminals, each terminal in electrical contact with a corresponding one of the elastomeric members; and
a processor for measuring the at least one electrical characteristic of each of the elastomeric members between each electrically conductive terminal and the TFTT, and determining the spatial location of a force applied to the TFTT from the measured electrical characteristics and the known locations of the elastomeric members.

8. The displacement sensor of claim 7 further comprising a non-conductive elastomeric material arranged to substantially fill the volume between the spaced apart conductive elastomeric members and electrically isolate the conductive elastomeric members from each other.

9. The displacement sensor of claim 8 wherein the non-conductive elastomeric material has substantially the same elastomeric response characteristics as the conductive elastomeric members.

10. The displacement sensor of claim 7 wherein the electrical characteristics of the elastomeric members comprise one or more members of the group consisting of: voltage, current, resistance, dielectric constant, and capacitance.

11. The displacement sensor of claim 7 wherein the electrical characteristics of the elastomeric members are processed by the processor so as to substantially map a surface topography of the TFTT with respect to the substrate.

12. The displacement sensor of claim 7 wherein the TFTT comprises an electrically conductive fabric.

13. The displacement sensor of claim 7 wherein the elastomeric members comprise a material having gaseous voids.

14. A method of providing user input to a computer, the method comprising:
providing a displacement sensor according to claim 7;
providing an orientation sensing capability for the displacement sensor;
altering a force applied to the displacement sensor to create an input to the computer to select a menu input mode for the computer;
altering an orientation of the displacement sensor to create an input to the computer to effect a change in menu selection; and
altering a force applied to the displacement sensor to create an input to the computer to make a menu selection.

15. The method of claim 14 further comprising applying a force to one or more locations on the displacement sensor to create an input to the computer to provide interaction with a virtual model of an object.

* * * * *